United States Patent [19]

Manico et al.

[11] Patent Number: 5,031,773
[45] Date of Patent: Jul. 16, 1991

[54] PHOTOGRAPHIC IMAGE SET

[75] Inventors: Joseph A. Manico, Rochester; William L. Burnham, Leroy, both of N.Y.

[73] Assignee: Eastman Kodak Company, Rochester, N.Y.

[21] Appl. No.: 538,868

[22] Filed: Jun. 15, 1990

[51] Int. Cl.$^5$ .............................................. B65D 85/00
[52] U.S. Cl. ...................................... 206/455; 355/64
[58] Field of Search .................. 206/455, 456; 355/54, 355/64

[56] References Cited

U.S. PATENT DOCUMENTS

| | | | |
|---|---|---|---|
| 3,460,282 | 8/1969 | Swirsky | 40/102 |
| 4,720,733 | 1/1988 | Ohtake et al. | 355/50 |
| 4,966,285 | 10/1990 | Otake et al. | 206/455 |

FOREIGN PATENT DOCUMENTS 60-48467  4/1985  Japan .

OTHER PUBLICATIONS

Photographic Magazine; 11/84; pp. 72-75; Negative Filing; John Morris.

*Primary Examiner*—William I. Price
*Attorney, Agent, or Firm*—Marianne J. Twait

[57] ABSTRACT

In a final phase of the photographic process a customer generally receives an envelope containing a group of prints and a plurality of strips of negatives associated with the prints. Packaging the prints and negatives in this manner can lead to the negatives getting demand and/or the negatives getting separated from the original prints, thus making it difficult to produce high quailty reprints and making it difficult to determine which negative is to be reprinted. A photographic image set including an index print integrally stored with the associated negative strips provides a convenient single storage and retrieval system. A method of making the photographic image set provides acceptable overall exposure of the index print and reduces the incidence of damage to the negative strips.

7 Claims, 7 Drawing Sheets

PHOTOGRAPHIC IMAGE SET

BACKGROUND OF THE INVENTION

1. Field of the Invention

The present invention relates generally to the field of photofinishing, and in particular to a photographic image set.

2. Description of the Prior Art

A step in a final phase of a photographic process is a customer receiving a group of prints and negatives corresponding to the prints. The prints and negatives are generally packaged in an envelope. Packaging the prints and negatives separately in the envelope can lead to a problem of the negatives becoming separated from the prints because the envelopes are carelessly thrown into a shoe box or the prints are placed in a photo album or framed or given away. Thus, when the customer wishes to order reprints he or she must spend time locating the negatives which correspond to the prints he or she wants to order. Moreover, because he or she doesn't have the benefit of the original print nearby, he or she must try to determine which negative corresponds to the print of which he or she wants a copy. This can be difficult to the amateur photographer who is not trained to view photographic negatives, because the subject image on the negative is reversed as is the contrast.

When the prints and negatives are packaged together in envelopes and returned to the customer the negatives are susceptible to scratching and contamination from dust, dirt and/or fingerprints because the paper envelope does not provide a damage-free environment for the negatives. These various forms of damage can create havoc with the emulsion of the negative thus reducing the quality of reprints from the damaged negatives.

Currently, the customer can purchase plastic transparent sleeves to hold the cut negatives. The unwary customer could cause the previously described damage to the negatives as he or she is inserting the negative strip into the sleeve. Furthermore, this procedure can be time consuming to the customer.

A type of photographic storage system is described in Japanese Utility Model Application (Kokai) JP 60-48467, published Apr. 5, 1985. This application discloses a photosensitive sheet for a photo album which has a plurality of pictures printed on one side of the photosensitive sheet and has a single pocket attached to a reverse side of the photosensitive sheet, for containing all the film negatives. The film negatives appear to be loosely held in the pocket. However, they can easily fall out of the pocket and thus be lost. Also, since the negatives are in contact with the photosensitive sheet, the negatives are subject to scratches from debris that may collect on the surface of the photosensitive sheet. In addition, the archival quality of the negatives may be harmfully affected due to residual paper process chemicals on the photosensitive sheet. Since the operator at the photofinisher will be handling the negatives when manually placing them in the pocket the negatives are subjected to damage if the operator is careless.

The final phase of the photographic process can include the step of reordering prints. Generally, the customer will bring a strip of negatives having the image he or she wants reprinted to the photofinisher. Sometimes it is difficult for the untrained eye to determine which image is really the one desired. Index prints can help in this situation. The index print generally has a plurality of images printed thereon. There is still the problem of matching the right negative with the print because the negatives may not be stored with the index print.

A method of making index prints is disclosed in U.S. Pat. No. 4,720,733 granted Jan. 19, 1988. The index print is made from a plurality of negative strips arranged in lines in an unfolded transparent negative holder. The index print and the transparent negative holder containing the negative strips are then placed in a box to be given to a customer. This has the disadvantage that the negatives can get separated from the index print, thus be lost.

SUMMARY OF THE INVENTION

The present invention is directed a photographic image set which will insure that the negatives are retained with positive images of their corresponding subject images on the negative strips at all times. This will ease the burden on the customer when he or she desires reprints of original prints which he or she may have framed or given away or placed in a photo album.

The photographic image set embodying the present invention includes an index print having a plurality of subject images recorded thereon and at least one strip of negatives having a predetermined number of image frames corresponding to the subject images. The negatives are stored in a transparent negative holder having a first wall attached to a second wall defining a pocket which is divided into discrete sections. The sections are similar in size and shape to the negative strip. The image set also includes means for integrally storing the transparent negative holder with the index print.

The photographic image set embodying the present invention provides a convenient single storage and retrieval system.

BRIEF DESCRIPTION OF THE DRAWINGS

Other advantages of the invention will become apparent from the following description taken in connection with the accompanying drawings wherein.

DESCRIPTION OF THE PREFERRED EMBODIMENT

The Photographic Image Set

A photographic image set 10 embodying the present invention generally includes an index print 12 combined with at least one negative film strip 14 to form a single storage system.

Figure 1A:
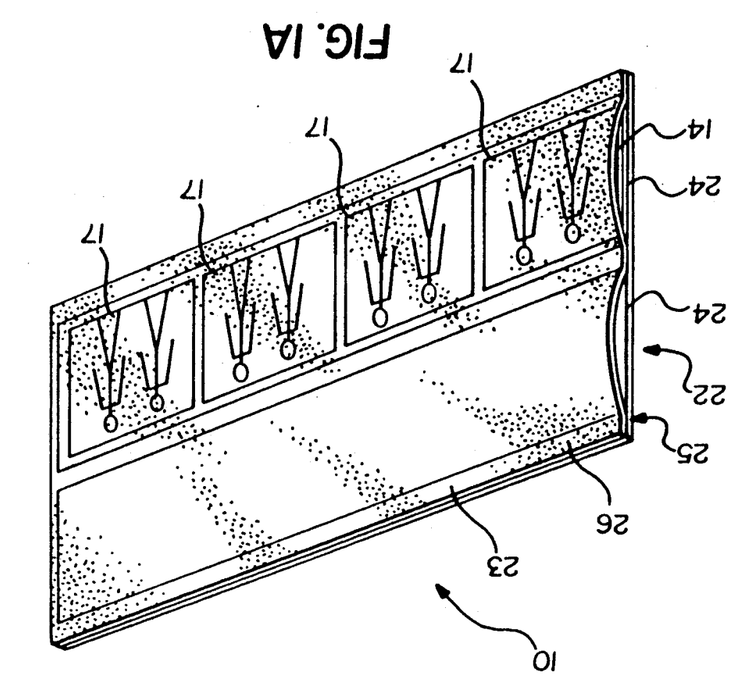
FIGS. 1A and 1B are perspective views of a preferred embodiment of a photographic image set embodying the present invention.
Figure 1B:
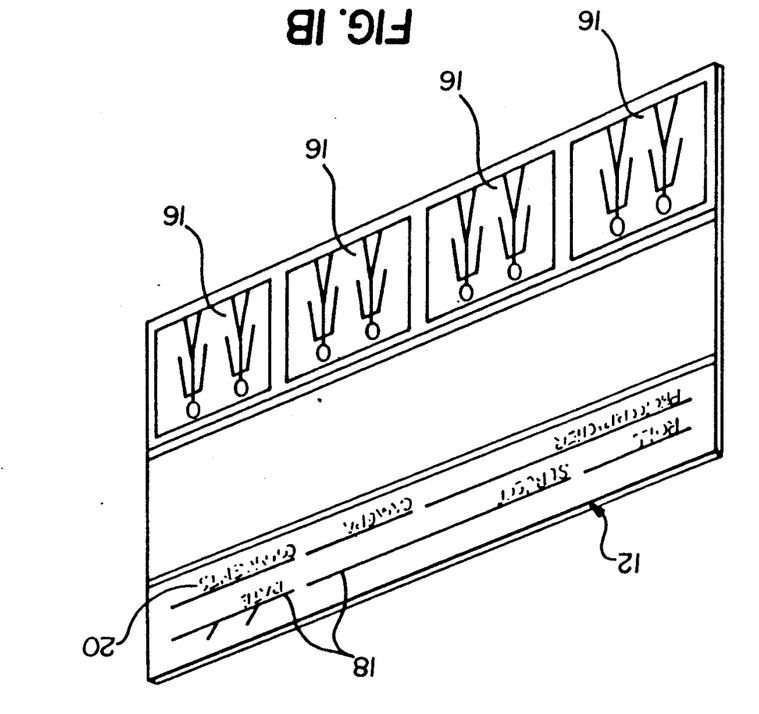

Referring now to FIGS. 1A and 1B a preferred embodiment of the photographic image set 10 will be described wherein the index print 12 and the negative film strip 14 are produced from a 35mm format roll of film. A plurality of subject images 16 are recorded on one side of a standard photosensitive paper with a standard print format of four inches by six inches to make the index print 12. This format provides space for printing two negative strips 14 each cut into strips having four 35mm size frames 17. This format also provides space for printing ruled line images 18 and/or captions 20 for recording customer specific information such as subject title, date, customer name, etc. Using the four by six inch format requires two photographic image sets 10 for a twelve frame roll of 35mm film, three photographic image sets 10 for a twenty four frame roll of 35mm film and five photographic image sets 10 for a thirty six frame roll of 35mm film.

It is obvious to one skilled in the art that a standard photosensitive paper with a standard print format of five inches by seven inches can be used to make the photographic image sets embodying the present invention. This format provides space for printing three negative strips 14 each cut into strips having four 35mm size frames 17. The five by seven inch format would require one photographic image set for a twelve frame roll of 35mm film, two photographic image sets for a twenty four frame roll of 35mm film and three photographic image sets for a thirty six frame roll of 35mm film. It should also be obvious to one skilled in the art that the photographic image set embodying the present invention would be advantageous to customers who prefer to use 110 format cartridges or 126 format cartridges.

The negative film strips 14 are stored in a transparent negative holder 22 which is laminated to a side of the index print 12 opposite the side the subject images are recorded. The negative holder 22 has a similar size and shape to two negative strips 14. The negative holder 22 comprises a first wall 23 and a second wall 25. The wall 23 provides a barrier between the negative strips 14 and the index print 12 to prevent the negative strips from directly contacting the index print. Providing this barrier prevents damage to the negative which can occur if the negative is in contact with the print. The barrier also protects the archival quality of the negative by preventing residual paper process chemicals from coming in contact with the negative strips. The second wall 25 is affixed to the first wall 23 at discrete elongated parallel sections to form discrete sleeves 24 each having a similar size and shape to one negative strip 14. Furthermore, the sleeves 14 are sealed along three edges forming an opening along a fourth edge, preferably at one end of the sleeve 24, for receiving the negative strip 14. One skilled in the art can see that the sleeves 24 can be open at both ends. Any conventional plastic material, preferably polyethylene, and any conventional method of manufacturing can be used to produce the negative holder 22.

The transparent sleeves can further include openings 27 to allow for a means to precisely locate the negative strips during the printing process. The means to locate the negative strips during the printing process will be described in connection with a printing apparatus.

A translucent layer 26 of glue, double stick tape, or any conventional adhesive is used for laminating the negative holder 22 to the index print 12. The adhesive layer 26 preferably is coated on the entire outside surface of the wall 23 of the negative holder 22 which gets adhered to the index print 12. This layer of adhesive 26 has diffusion characteristics which are advantageous to the printing of the index print 12. The advantage of the adhesive layer will be apparent when the method of making the photographic image set is described. A sheet of clear polyester (not shown) will cover the adhesive layer 26 to prevent the negative holder 22 from getting laminated to objects other than the index print 12.

Figure 2:
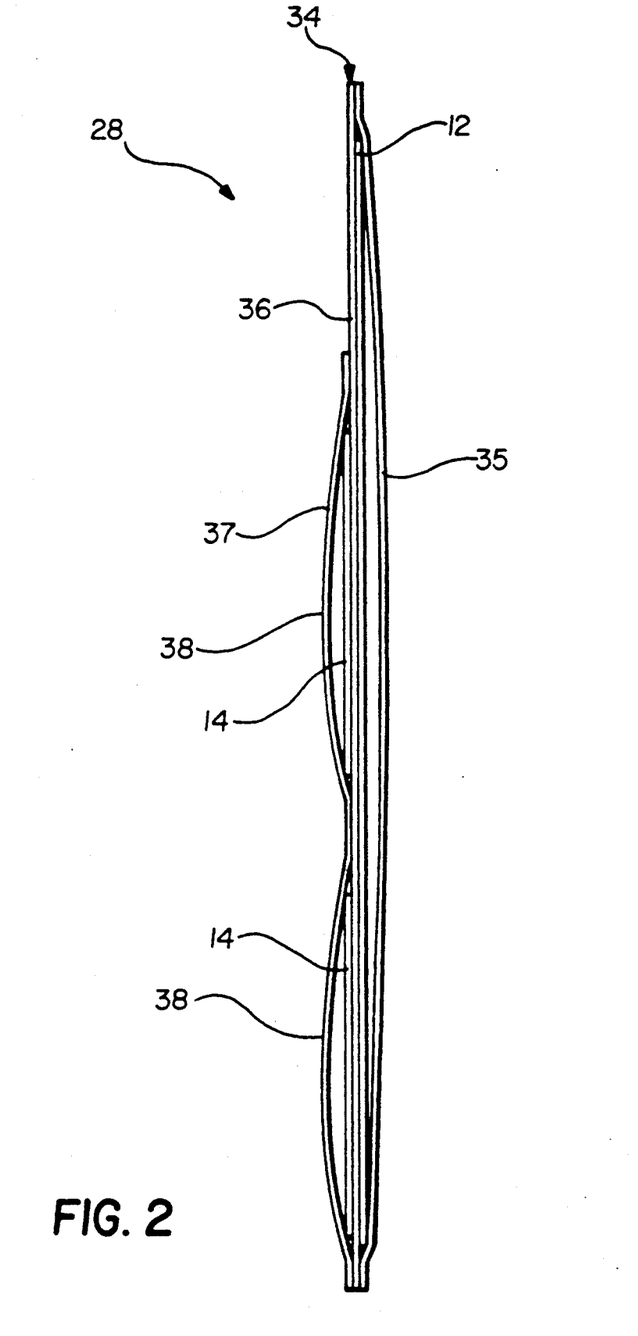
FIG. 2 is a plan view of an alternative embodiment of the photographic image set embodying the present invention.

Referring now to FIG. 2 an alternative embodiment of the photographic image set 28 embodying the present invention will be described. This photographic image set 28 includes an index print 12 and negative strips 14 similar to the index print 12 and negative strips 14 described previously. A transparent negative holder 34, similar in size and shape to the index print 12, includes two walls 35,36 sealed along three edges to define a pocket for storing the index print 12. The wall 36 provides a barrier between the negative strips 14 and the index print 12 to prevent the negative strips from directly contacting the index print. As mentioned previously, damage to the negative can occur if the negative is in contact with the print. The negative holder 34 also includes a layer 37 divided into two sections to form discrete sleeves 38 each having a similar size and shape to one negative strip 14. Furthermore, the sleeves 38 are sealed along three edges forming an opening along a fourth edge, preferably at one end of the sleeve 38, for receiving the negative strip 14. One skilled in the art can see that the sleeves 38 can be open at both ends also. Any conventional plastic material, preferably polyethylene, and any conventional method of manufacturing can be used to produce the negative holder 34. The negative holder 34 of this alternative embodiment will form a double layer of polyethylene over the negative strips which will be advantageous during printing of the index print 30. The advantage of the double layer of polyethylene will be apparent when the method of making the photographic image set is described.

The Apparatus for Making the Photographic Image Set

Accessory packages for making the photographic image sets described previously can be designed to fit conventional photographic printers currently in use in photofinishing labs and/or stores. The design of the accessory package and the method of making the photographic image set will vary depending on the type of photographic printer to be used and the type of photographic image set desired. Because photographic printers and the general operations associated therewith are well known in the art, the description hereinafter will be directed in particular only to those printer parts relevant to the present invention. It is to be understood, however, that printer components not specifically shown or described may take various forms selectable from those known in the art.

Figure 3:
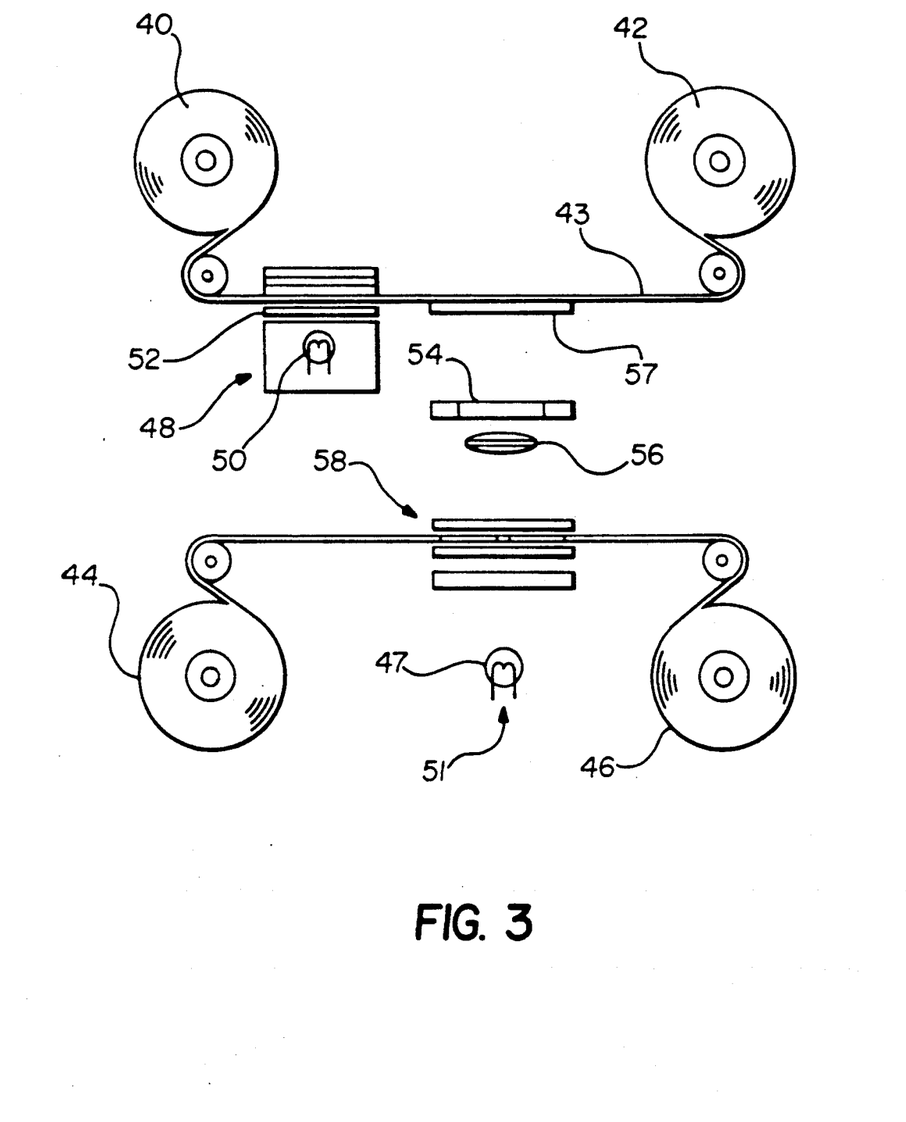
FIG. 3 is a schematic view of a printing apparatus used to make the photographic image set.

FIG. 3 shows a schematic view of a conventional Kodak Color Printer Model 5S manufactured by Eastman Kodak Co.. This photographic printing apparatus will be described in connection with the photographic image set 10 shown in FIG. 1. The printer includes a paper supply 40 and a paper take-up 42 for transporting a web of photosensitive paper 43 through the printer. The rolls of photosensitive paper 43 will have a width corresponding to the cut size of the index print. The accessory package for a printer such as the Model 5S Printer can include supply and take-up reels 44,46 for transporting a web, uncut roll, of transparent negative holders 22 having negative strips 14 previously inserted into the transparent sleeves 24. The roll of transparent negative holders 22 is placed in the printer such that the adhesive layer 26 is facing a main light source 47 in the printer.

Any conventional negative cutter/sleever (not shown) can be used to automatically insert the negative strips 14 into the transparent sleeves 24 of the transparent negative holder 22. A reel of processed negatives and a reel of transparent negative holders 22 in web form are attached to the cutter/sleever. The cutter/sleever automatically inserts negatives into the transparent sleeve 24. The negatives are then cut into strips having four image frames per strip. The cutter/sleever can be mounted directly onto the printer such that the transparent negative holders 22 containing the negative strips 14 are fed directly into the printer.

A contact printer station 48 includes a light source 50 for projecting light through a "litho" negative 52, having ruled line images 18 and/or captions 20 prerecorded thereon, to form an exposure of the ruled line images 18 and/or captions 20 on the photosensitive paper 43.

A main printing station 51 on the printer includes standard features such as an exposure control 54, having a shutter apparatus (not shown) and cutoff filters (not shown), and a printing lens 56. The printing lens 56 projects the subject images recorded in the frames 17 of the negative strip 14 onto the photosensitive paper 43 using a one to one magnification in accordance with the preferred embodiment. The main printing station 51 also includes a paper mask 57 for defining the area to be exposed on the photosensitive paper.

Figure 4A:
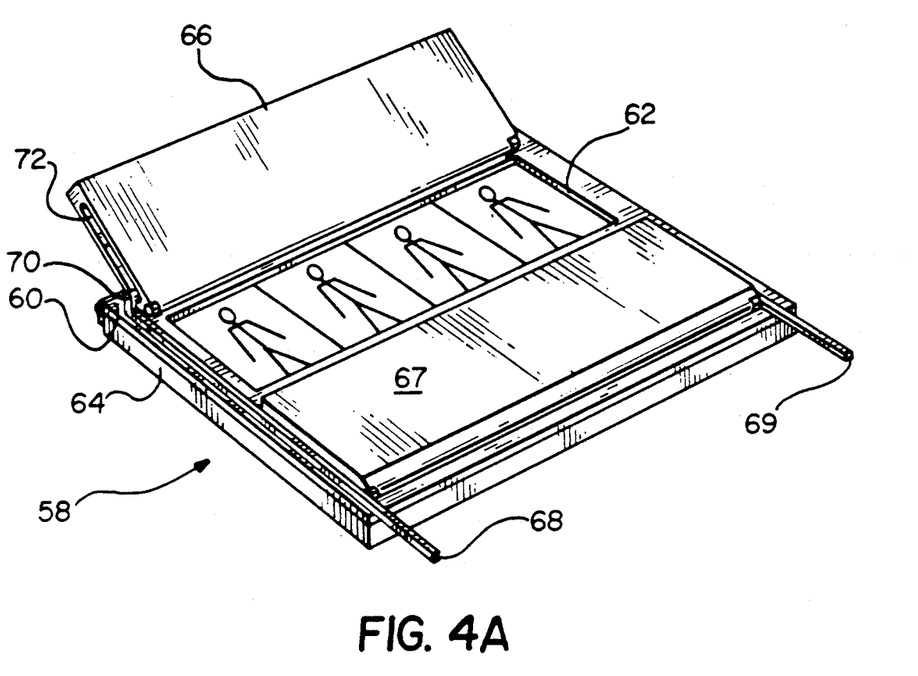
FIG. 4A is a perspective view of a negative mask for use with the printer of FIG. 3
Figure 4B:
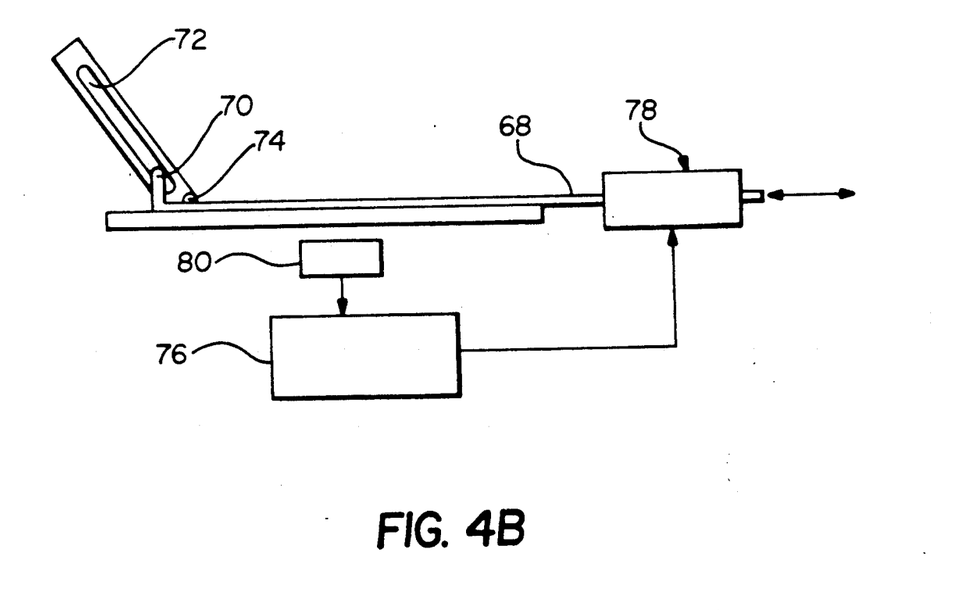
FIG. 4B is a schematic view of the mask.

The printer further includes a negative mask 58, shown in more detail in FIG. 4A and 4B, for holding the transparent negative holder 22 with the negative strips 14 and for defining the area of the negative strips 14 to be exposed onto the photosensitive paper 43. The negative mask 58 comprises an opaque base 60 defining a rectangular shaped aperture 62. In accordance with the present embodiment the size of the aperture 62 is approximately the size of two negative strips 14 each cut into lengths having four 35mm size frames 17. A frame 64 defining a printing aperture (not shown) is attached to opaque base 60 using any conventional fastening device. The printing aperture is substantially in registry with aperture 62. The transparent negative holder 22 having the negative strips 14 is held between the base 60 and the frame 64 during the printing of the subject images from the negatives 14 onto the paper 43.

As mentioned previously, there is a possibility that only one negative strip will be present in the negative holder if a photographic image set is requested for a twelve frame roll of 35mm film. This empty area in the aperture 62 will expose the photosensitive paper 43 to an undesirable large amount of light which will create large black areas in the final print which can be aesthetically unappealing. Furthermore, this large amount of light can drastically effect any exposure calculations the printer may perform. Therefore, to prevent an empty area of the aperture 62 from allowing large amounts of light to be projected onto the paper 43 aperture covers 66,67 are provided and are pivotally attached to opposite edges of the aperture 62 to cover an empty area of the aperture 62 when the absence of a negative strip 14 is detected. The aperture covers 66,67 can be operated automatically, in accordance with the present invention, or manually. A pin 70 attached to one end of arm 68 engages slot 72 formed in the cover 66 such that when the arm 68 is actuated the cover 66 will pivot about hinge 74. Solenoid 78 attached to arm 68 is connected to a computer 76 which controls the operation of the printer. A conventional sensor 80 is also connected to the computer 76 for detecting the presence or absence of negative strips 14 in the transparent holder 22 such that a signal indicating the absence of a negative strip 14 is sent to the computer 76 which in turn sends a signal to the solenoid 78 to actuate the arm 68 to close the cover 66. Arm 69 will be operated in a similar manner to arm 68 if the sensor 80 detects an empty area associated with cover 67.

Figure 7A:
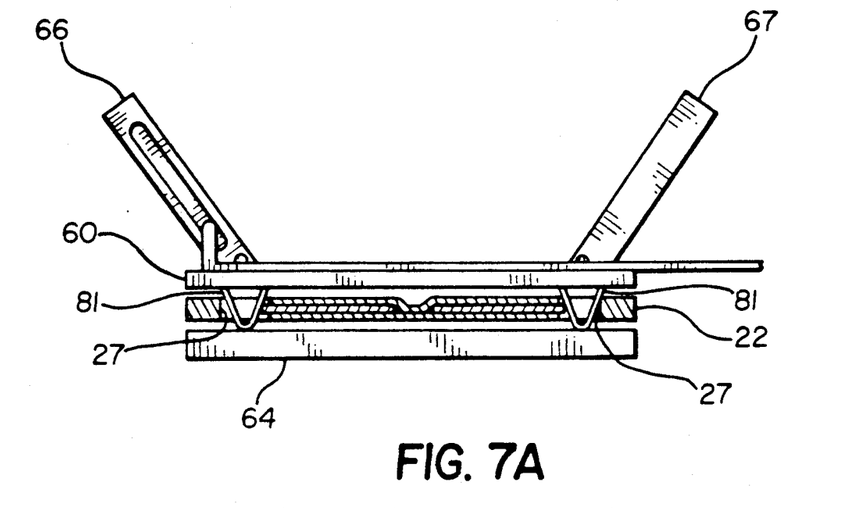
FIGS. 7A and 7B are plan views of an alternative embodiment of the negative mask shown in FIGS. 4A and 4B.
Figure 7B:
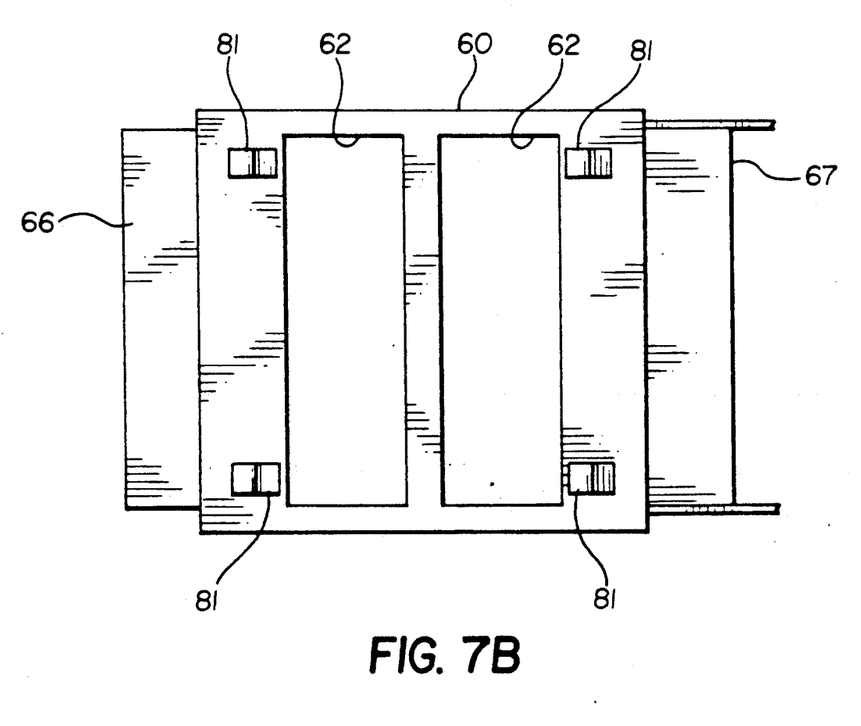

The opaque base 60 can include flexible fingers 81, shown in FIGS. 7A and 7B, for contacting the edges of the negative strips to precisely locate the negative strips during the printing process. The fingers will project through openings 27 in the transparent sleeves and contact the edges of the negative strip.

Referring back to FIG. 3, the main printing station includes the main light source 47 for projecting light rays through the negative holder 22 and the subject images recorded in the frames 17 on the negative strip 14 to form an exposure on the paper 43. Initially, the light rays projected from the main light source 47 are transmitted specularly. Diffusing the specular light rays would make scratches and other negative defects less noticeable in the final print. Therefore, the light rays from the main light source 47 are also projected through the adhesive layer 26 which functions to diffuse the light rays so that scratches and other negative defects are far less noticeable than if the light rays remain specular.

As with any conventional printer, the roll of exposed paper 43 is then taken to a processing apparatus (not shown) to develop the exposed paper 43. The paper is then cut into discrete index prints 12.

The roll of transparent negative holders 22 is cut into the individual holders 22 at any time after the printing process.

A method of making the photographic image set 10 in accordance with the present invention will now be described in connection with the printer apparatus shown in FIGS. 3 and 4.

The negative strips 14 are automatically inserted into the transparent negative sleeves 24 by the negative cutter/sleever. Of course, the negative strips can be inserted into the transparent sleeves manually.

The photosensitive paper 43 is first exposed to the ruled line images 18 and/or captions 20 from the "litho" negative at the contact printer station 48. The paper 43 is then transported to the main printing station. The main light source 47 projects light rays through the adhesive layer 26, transparent negative holder 22 and the negative strip 14 to expose the photosensitive paper 43 to the subject images recorded on the negative strip 14. If two negative strips 14 are present in the negative holder, two rows of four images each will be printed onto the paper 43. If only one negative strip 14 is present, the sensor 80 will detect the absence of a negative strip 14 and send a signal to the printer computer 76. The computer 76 will then send a signal to instruct the solenoid 78 to actuate one of arms 68, 69 to close one of the aperture covers 66,67. Thus, only one row of four images is printed onto the photosensitive paper 43. The photosensitive paper 43 is then sent to the processor for development.

The negative holder 22 is then adhered to the index print 12 to a second side of the index print 12. In accordance with the present invention, the clear mylar layer (not shown) is peeled away from the adhesive layer 26 and the negative holder 22 containing the negative strips 14 is laminated to a side of the index print 12 which is opposite the side having the corresponding subject images printed thereon.

The above printer apparatus with slight modifications can be used to make the photographic image set 28 described in FIG. 2. The light rays from the main light source 47 will be diffused by a double layer of polyethylene. One layer of the polyethylene forms the pocket for the index print and the second layer of polyethylene forms the wall between the index print 12 and the negative strip 14. This double layer of polyethylene functions, similar to the adhesive layer 26, to enhance the diffusion of the light rays thus providing a better overall exposure for the index print 12. The index print 12 is inserted into the pocket formed by walls 35 and 36 before the image set is given to a customer.

Figure 5:
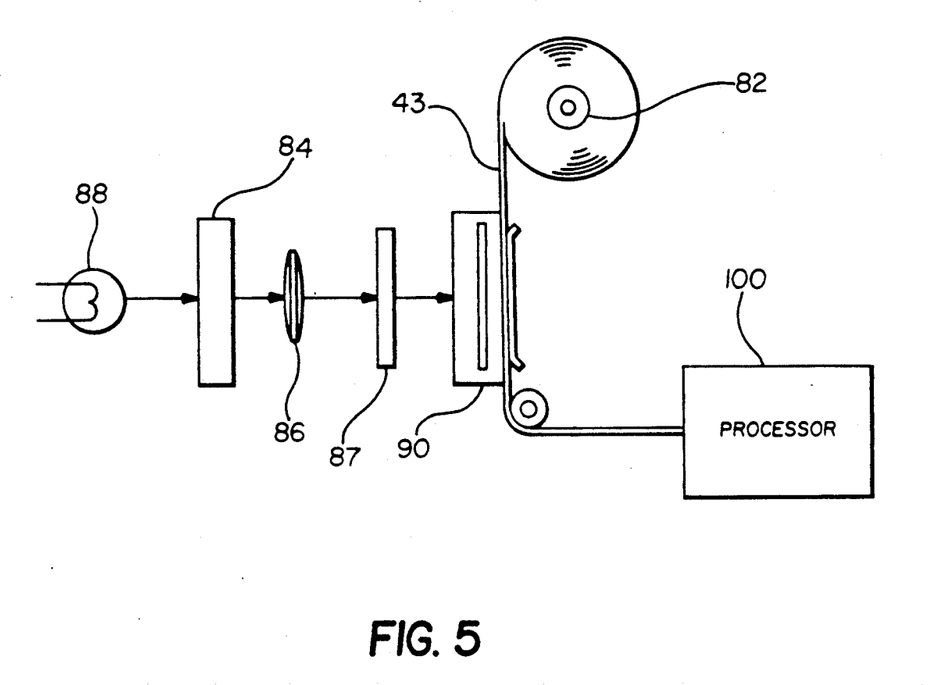
FIG. 5 is a schematic view of an alternative printing apparatus used to make the photographic image set.

FIG. 5 shows a schematic view of a conventional Kodak System 50 Minilab manufactured by Eastman Kodak Co.. This photographic printing apparatus will be described in connection with the photographic image set 10 shown in FIG. 2. The printer includes a paper supply 82 and a paper take-up (not shown) for transporting a web of photosensitive paper 43 through the minilab. The rolls of photosensitive paper 43 will have a width corresponding to the cut size of the index print.

Any conventional negative cutter/sleever (not shown) can be used to automatically insert the negative strips 14 into the transparent sleeves 24 of the transparent negative holder 22. A reel of processed negatives and a reel of transparent negative holders 10 in web form are attached to the cutter/sleever. The cutter/sleever automatically inserts negatives into the transparent sleeve 24. The negatives are then cut into strips having four image frames per strip. The web is then cut into discrete negative holders 10. If any transparent sleeve areas are left empty, which can occur if a photographic image set is desired for a twelve frame roll of film, an opaque strip similar in size and shape to the negative strip 14 is inserted into the empty areas. The opaque strips will prevent large black areas on the index print which can be unappealing and will insure that the exposure corrections are calculated correctly by the printing apparatus.

The minilab further includes a negative holder 84 for clamping negatives during a conventional printing process, a printing lens 86, an exposure control assembly 87 and a light source 88.

Figure 6A:
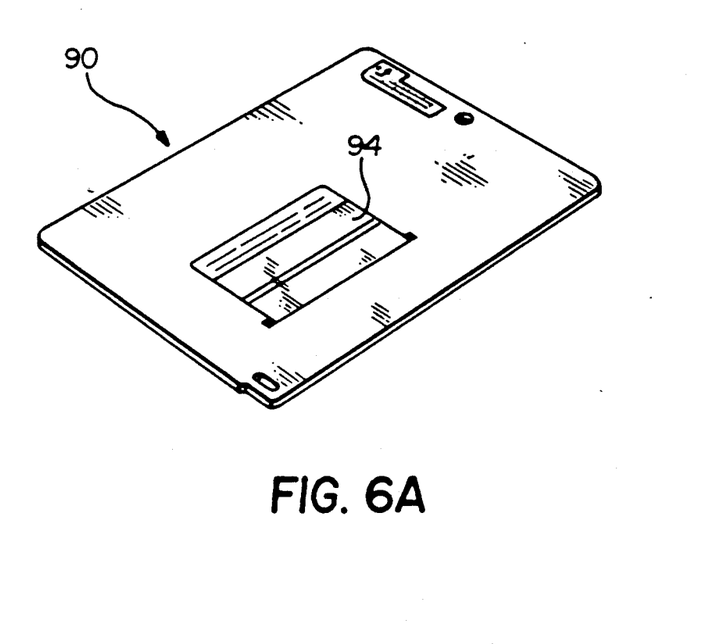
FIGS. 6A and 6B are perspective views of a negative mask for use with the printer of FIG. 5.
Figure 6B:
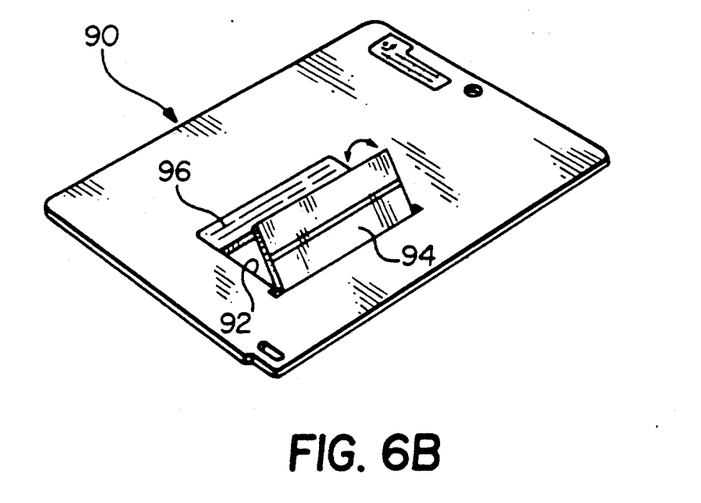

An accessory package for making the photographic image set using the minilab will include a contact printing mask 90, shown in FIGS. 6A and 6B, to be inserted into the minilab such that the mask is located adjacent the paper 43. The mask 90 includes a rectangular shaped aperture 92 defining an exposure area having a chamber 94 pivotally attached along one edge of the aperture 92 for holding the transparent negative holder 22 during the printing process.

The aperture area 92 is similar in size and shape to the index print 12 and includes an area for inserting a "litho negative" 96 having the ruled line images 18 and/or captions 20 recorded thereon for exposing onto the paper 43. The chamber 94 is similar in size and shape to two negative strips each cut into lengths having four image frames 17.

The minilab further includes a processor 100 for developing the exposed photosensitive paper.

A method for making the photographic image set 10 will be described in connection with the printer apparatus shown in FIGS. 5, 6A and 6B.

The negative strips 14 are automatically inserted into the transparent negative sleeves 24 by the negative cutter/sleever. It is obvious to one skilled in the art that the negative strips can be inserted into the negative sleeves manually. The web of negative holder material is then cut into discrete negative holders 22.

The chamber 94 is pivoted to an open position as shown in FIG. 6B and the negative holder 22 containing the negative strips 14 is inserted into the chamber 94 such that the adhesive layer 26 will be facing the light source 88. The chamber 94 is then pivoted to a closed position as shown in FIG. 6A. The mask 90 containing the transparent negative holder 22 and the "litho negative" 96 is inserted into the minilab at a location adjacent to the paper 43.

Referring back to FIG. 5 the light source 88 projects light rays through the negative holder 22 and the "litho negative" 96 to expose the paper 43 to the subject images recorded in frames 17 and the line images 18 and captions 20 simultaneously. As described in connection with the printing apparatus shown in FIG. 3, the light rays are initially projected specularly which can cause scratches and other negative defects to be very noticeable on the index print 12. Therefore, the adhesive layer 26 enhances the diffusion of the light rays so that scratches and other negative defects are far less noticeable than if the light rays remain specular. If two negative strips 14 are present in the negative holder, two rows of four images each will be printed onto the paper 43. If only one negative strip 14 is present one row of four images will be printed onto the paper 43.

The exposed paper is then transported through to the processor for developing. The web of paper is then cut into discrete index prints 12 ready to be adhered together with the negative holders 22. In accordance with the present invention, the clear polyester layer (not shown) is peeled away from the adhesive layer 26 and the negative holder 22 containing the negative strips 14 is laminated to a side of the index print 12 which is opposite the side having the corresponding subject images printed thereon.

The printer apparatus described in connection with FIG. 5 with slight modifications can be used to make the photographic image set 28 described in FIG. 2. The light rays from the main light source 47 will be diffused by a double layer of polyethylene. One layer of the polyethylene forms the pocket for the index print and the second layer of polyethylene forms the wall between the index print 12 and the negative strip 14. This double layer of polyethylene functions, similar to the adhesive layer 26, to enhance the diffusion of the light rays thus providing a better overall exposure for the index print 12. The index print 12 is inserted into the pocket formed by walls 35 and 36 before the image set is given to a customer.

A photographic image set which provides a convenient way to store index prints and negatives has been described. The image set as described also provides a burdenless means to order extra prints of a preferred original print. An acceptable overall exposure of the index print is provided by the method described above for making the photographic image set. This method further reduces the number of times a negative is handled thus reducing the number of defects on the negative.

The photographic image set has been described in connection with conventional photographic printing apparatus. It is obvious to one skilled in the art that a photographic image set can include an index print which has been electronically produced from negatives and can include the negative strips associated with the images produced on the index print.

An alternative method (not shown) for adhering a transparent negative holder to an index print will now be described. It is well known in the art that conventional photographic paper includes a resin coating of polyethylene. It is also well known that polyethylene works well in a heat lamination process. Therefore, the transparent negative holder can be heat laminated to an index print. Although this is a viable method of producing a photographic image set, this method does not benefit from having the diffusing layers described previously.

The present invention has been described in detail with particular reference to a preferred embodiment thereof, but it will be understood that variations and modifications can be effected within the spirit and scope of the invention.

We claim:

1. A holder for storing a photographic image set, said holder comprising:
    a first transparent wall;
    a second transparent wall;
    means for affixing said second wall to said first wall at discrete elongated parallel sections to form respective sleeves for accepting photographic negative strips;
    a light diffusing element substantially coextensive with at least said sleeves; and
    means for affixing said diffusing element to one of said transparent walls.

2. The holder as defined in claim 1, wherein said light diffusing element comprises a layer of a translucent adhesive coated on at least said sleeves.

3. The holder as defined in claim 1, wherein said light diffusing element comprises
    a third transparent wall; and
    means for affixing said third transparent wall to one of said first or second transparent walls at at least two opposing edges of said walls to form a pocket for receiving an index print.

4. The holder as defined in claim 1, wherein said light diffusing element comprises
    a third transparent wall; and
    means for affixing said third transparent wall to one of said first or second transparent walls along at least three edges of said walls to form a pocket for receiving an index print.

5. A photographic image set including an index print having a plurality of images recorded thereon and at least one negative strip cut into lengths having a predetermined number of frames corresponding to the images on the index print, said image set comprising:
    a transparent negative holder having a first wall attached to a second wall defining a pocket and having an opening on at least one end of said pocket, said pocket is divided into at least two discrete sections for holding the negative strip, each section having a similar size and shape to the negative strip; and
    means for integrally storing said transparent negative holder with the index print.

6. The photographic image set as defined in claim 5, wherein said means for storing includes
    a clear adhesive layer coated on an outer side of one of said walls for adhering said transparent negative holder to said index print.

7. The photographic image set as defined in claim 5, wherein said means for storing includes
    a third wall attached to said second wall defining a pocket similar in size and shape to the index print for storing the index print with the negative strip; and
    means for fixing said third wall to said second wall sealed along at least two opposing edges of said walls defining an opening for inserting the index print.

* * * * *